(12) United States Patent
Eng

(10) Patent No.: US 8,517,456 B1
(45) Date of Patent: Aug. 27, 2013

(54) CAB SUSPENSION MEMBER FOR TERMINAL TRACTORS

(76) Inventor: Allen L. Eng, Edmond, OK (US)

( * ) Notice: Subject to any disclaimer, the term of this patent is extended or adjusted under 35 U.S.C. 154(b) by 0 days.

(21) Appl. No.: 13/507,664

(22) Filed: Jul. 18, 2012

(51) Int. Cl.
*B60N 99/00* (2006.01)

(52) U.S. Cl.
USPC .............................. 296/190.07; 280/124.179

(58) Field of Classification Search
USPC ........... 296/190.07; 180/89.13, 89.12, 89.19; 267/275, 294; 280/124.177, 124.179, 124.164
See application file for complete search history.

(56) References Cited

U.S. PATENT DOCUMENTS

| | | | |
|---|---|---|---|
| 4,186,914 A | 2/1980 | Radwill | |
| 4,294,324 A | 10/1981 | Kimball | |
| 4,871,189 A | 10/1989 | Van Breemen | |
| 5,209,316 A | 5/1993 | Bauer | |
| 5,249,652 A | 10/1993 | Leitzman | |
| 5,253,853 A | 10/1993 | Conaway | |
| 5,396,973 A | 3/1995 | Schwemmer | |
| 5,590,733 A | 1/1997 | Ljungholm | |
| 5,775,469 A | 7/1998 | Kang | |
| 5,957,231 A * | 9/1999 | Conaway et al. .......... | 180/89.14 |
| 5,964,310 A | 10/1999 | Gylliner | |
| 6,073,714 A | 6/2000 | McHorse | |
| 6,408,970 B1 | 6/2002 | Eng | |
| 6,726,272 B1 | 4/2004 | Puterbaugh | |
| 6,883,860 B1 * | 4/2005 | Budge ...................... | 296/190.08 |
| 6,986,545 B2 | 1/2006 | Nilsson | |
| 7,040,425 B2 | 5/2006 | Hammonds | |
| 7,111,862 B1 * | 9/2006 | Eng ............................. | 280/438.1 |
| 7,722,008 B2 | 5/2010 | Yoon | |
| 8,182,024 B2 | 5/2012 | Hayes | |
| 2009/0167057 A1 * | 7/2009 | Walter et al. ............. | 296/190.03 |

* cited by examiner

*Primary Examiner* — Lori Lyjak
(74) *Attorney, Agent, or Firm* — Randal D. Homburg

(57) ABSTRACT

An improved cab suspension member to replace an existing factory suspension providing a terminal tractor with an improved rear suspension to improve the ride and performance of a terminal tractor, the improved rear suspension installed after market or provided as an original factory installation, the improved rear suspension members applied under the rear cab portion of the terminal tractor, increasing the suspension support and also redistributing the load upon the terminal tractor cab.

16 Claims, 11 Drawing Sheets

CAB SUSPENSION MEMBER FOR TERMINAL TRACTORS

CROSS REFERENCE TO RELATED APPLICATIONS

None.

I. BACKGROUND OF THE INVENTION

1. Field of Invention

An improved cab suspension member to replace an existing factory suspension providing a terminal tractor with an improved rear suspension to improve the ride and performance of a terminal tractor, the improved rear suspension installed after market or provided as an original factory installation, the improved rear suspension members applied under the rear cab portion of the terminal tractor, increasing the suspension support and also redistributing the load upon the terminal tractor cab.

2. Description of Prior Art

A preliminary review of prior art patents was conducted by the applicant which reveal prior art patents in a similar field or having similar use. However, the prior art inventions do not disclose the same or similar elements as the present improved terminal tractor rear suspension system, nor do they present the material components in a manner contemplated or anticipated in the prior art.

A suspension system for a vehicle cab including springs and a sway resisting torsion bar is disclosed in U.S. Pat. No. 6,073,714 to McHorse, et al. which is provided to minimize lateral sway of the cab, primarily through use of a bushing or a singular spring and the torsion bar. A combination spring/shock absorber is disclosed in U.S. Pat. No. 5,590,733 to Ljungholm, et al. in which four shock absorbers with external springs are provided to cushion the cab of a tractor truck, also employing a second shock absorber on a lateral arm for diagonal reinforcement and suspension. A vibration dampening shock absorber is disclosed in U.S. Pat. No. 5,253,853 to Conaway, et al.

A two stage dampening shock absorber is disclosed in U.S. Pat. No. 5,249,652 to Leitzman, et al., which provides a primary force dampener with a second, stronger force dampener within the single shock absorber. U.S. Pat. No. 5,209,316 to Bauer and U.S. Pat. No. 4,871,189 to Van Breemen both disclose suspension systems using air springs, an air reservoir, shock absorbers and height control valves. A dual spring suspension system for railroad cars, having an inner coil spring with an additional stronger outer coil spring is disclosed in U.S. Pat. No. 4,186,914 to Radwill, et al.

In U.S. Pat. No. 6,408,970 to Eng (same inventor as in this present application) a three point cab suspension system for a terminal tractor provides for two front mount assemblies and one single rear mount assembly to redistribute the central mass of the terminal tractor and provide for a more stable and comfortable ride. Since the issuance of that patent, several subsequent patents address cab suspension systems. In U.S. Pat. No. 6,726,272 to Puterbaugh, an air spring damping system is disclosed to replace two to four points of the cab suspension system with the improved air spring suspension member. U.S. Pat. No. 6,986,545 to Nilsson discloses a cab suspension device having two stacked components, including a first element for the absorption of shock and vibration from the vehicle frame and a second element to act as a load support between the cab and the frame.

II. SUMMARY OF THE INVENTION

The primary objective of the invention is to provide an improved terminal tractor cab suspension member, provided as a singular suspension member underneath the driver side portion of the terminal tractor cab or as paired suspension members with specific differential distribution suspension capacities to balance the load on the terminal tractor cab, replacing a current factory supplied four point suspension system with the improved rear suspension system by a high capacity rear suspension assembly provided by either a single improved suspension member or by a pair of rear suspension members which provide differing suspension capacities to distribute the mass of the offset cabs on terminal tractors, effectively converting the terminal tractor suspension to a modified three point suspension system having a single rear point containing a dual directional suspension system for absorption of both upward and downward forces exerted on the cab, or replacing a dual rear suspension system with a paired improved rear suspension assembly which have different weighted suspension capacities to distribute the forces on the rear suspension system in accordance to the effective balanced forces acting upon the rear suspension of the terminal tractor.

Most terminal tractors are built with the rear axle mounted directly to the frame, referred to as a "hard tail" or "solid mount" which indicates the lack of a flexible rear suspension system on the chassis. These vehicles are known to create a hard ride with operator discomfort and maintenance cost increase to the vehicle. Rough terrain transfers shock loading to the cab causing the cabin to pitch, roll and backslap the driver throughout operation.

The industry standard four point mounting system has two front mounts allowing the cabs to tilt forward for maintenance. They are typically rubber bushings enclosed in steel sleeves with cap screws or pins inserted through the centers of the bushings to create the pivot point. Very limited movement is obtained by the rubber bushings and achieve less than ¼ inch movement relative to the chassis. Virtually all pitch and roll movement of the chassis is transferred to the cab, causing the cabin to be thrown at every bump, even on the more recent patented devices.

The rear mounts of the four point mounting system are rubber pads, cushions or rubber dock bumpers at both frame rails under the rear of the cab. They too are stiff and apply less than ¼ inch deflection to cushion the ride. The cab bucks up and forward every time a bump is hit and the constant pitch, roll, bump and bucking of the cab leads to premature failure of all involved components. Electrical systems fail, connections vibrate loose, terminals crack and separate, lamps burn out or rupture, switches and resistors fail and motor life is shortened.

Major terminal tractor manufacturers have tried for years to develop a rear suspension system that would provide the flexibility to improve ride character and be adaptable for full and empty loading conditions, and durable for high cycle terminal applications. Air suspensions are expensive and difficult to maintain in terminal applications. Additionally, terminal tractor cabs do not adapt well to highway tractor applications because most, if not all, terminal tractors have the offset cab configuration where the majority of the cab is left of center, thus providing an offset balance of the cab design, making the factory supplied four point system center of gravity not anywhere near the center of gravity of the terminal tractor cab, which is generally nearest the left frame rail. Major imbalances and stresses result from the application of these four point systems to the left set terminal tractor applications.

III. DESCRIPTION OF THE DRAWINGS

The following drawings are submitted with this utility patent application.

IV. DESCRIPTION OF THE PREFERRED EMBODIMENT

Figure 1:
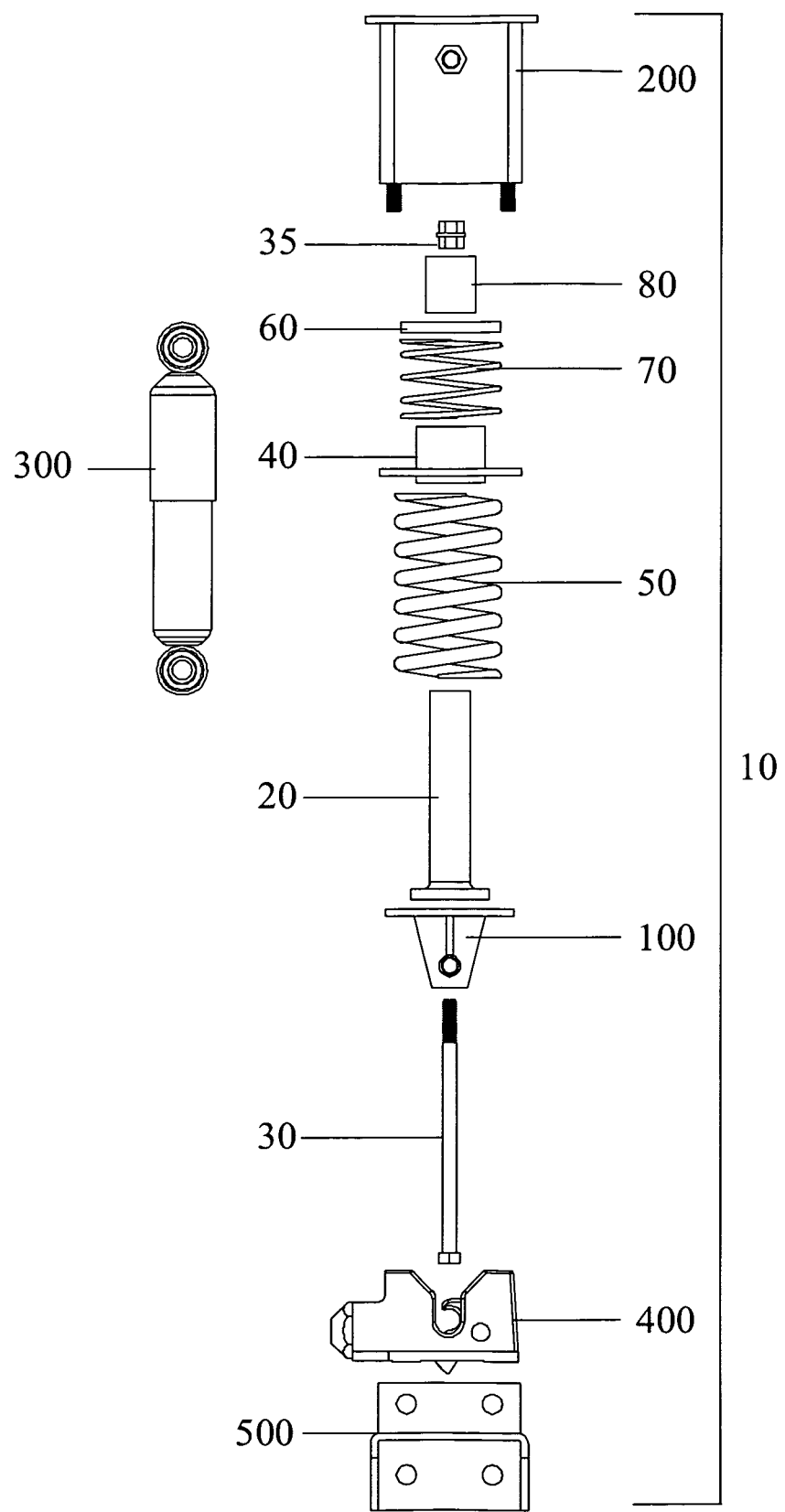
FIG. 1 is an exploded diagram of the component parts of the improved cab suspension member.

An improved cab suspension member 10 replacing an existing suspension member in a terminal tractor, primarily directed to a rear suspension, provides an improved distribution of the weight of the cab and a more balanced and smooth ride than a conventional suspension system. The improved cab suspension member 10 replaces an existing cab suspension member between the cab X and the terminal tractor chassis Y and is provided as a single rear suspension member embodiment 10 or as a paired rear suspension member embodiment 10A, 10B. The improved rear suspension member 10 comprises assembled components including an upper housing 200, a lower latch bracket 100 through which is installed a suspension capsule retainer bolt 30, the retainer bolt 30 supporting a center support tube 20 further supporting a rebound spring 50, a main carrier spring 70, a center support and spring mount 40 installed between the rebound spring 50 and the main carrier spring 70, an upper spring capture plate 60, an upper urethane spring 80 and a washer and nut assembly 35. A shock absorber 300 is also secured between a lower shock mounting stud 109 extending laterally from the lower latch bracket 100 and an upper shock mounting stud 207 extending laterally from the upper housing 200. The lower latch bracket 100 further provides a latch bar 108 to which an existing hydraulic latch assembly 400 mounted to a hydraulic latch mounting bracket 500 installed upon the terminal tractor chassis Y secures the cab X of the terminal tractor in a transport position.

Figure 10:
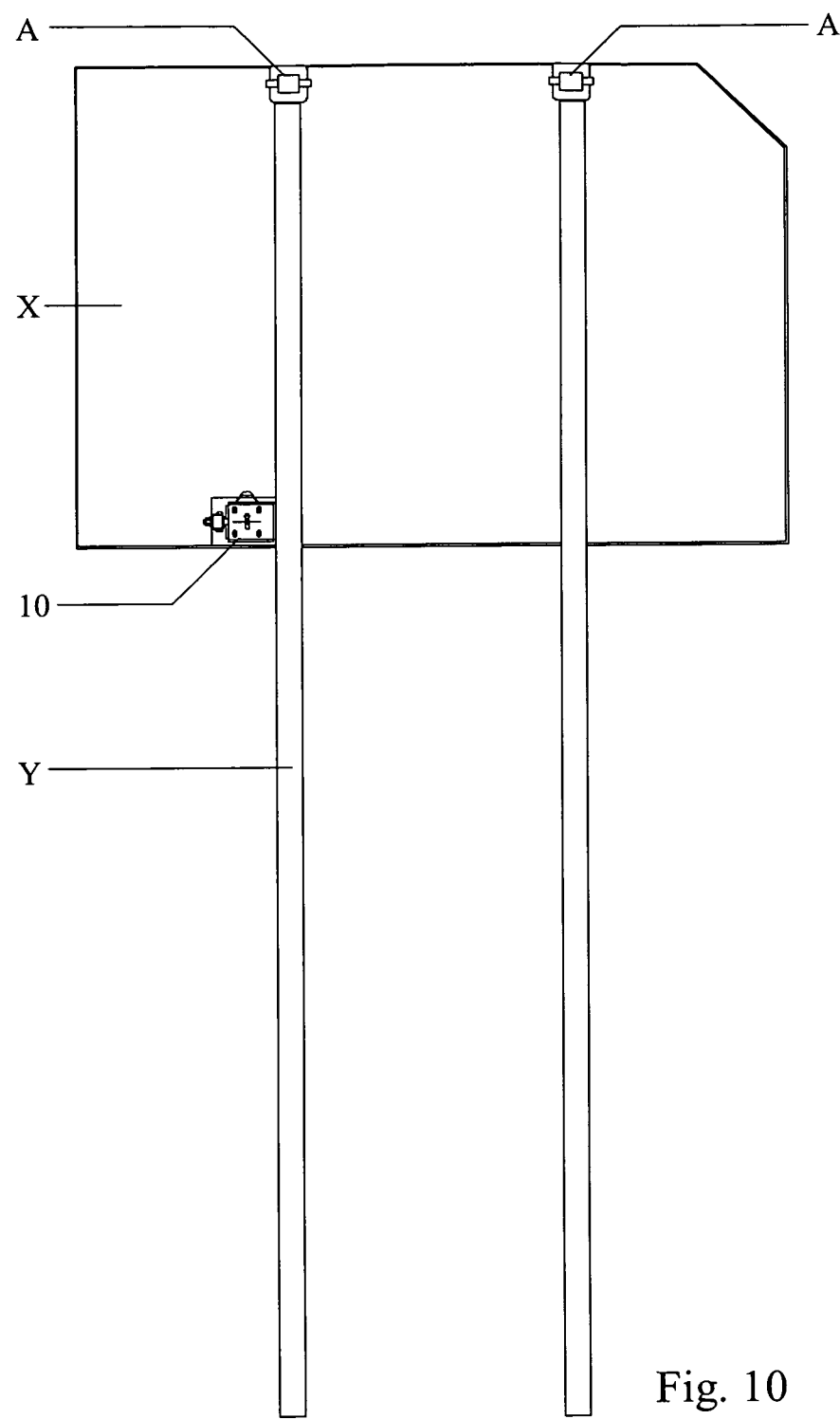
FIG. 10 is an overhead view of the placement of a single embodiment of the improved cab suspension member on a terminal tractor frame.
Figure 11:
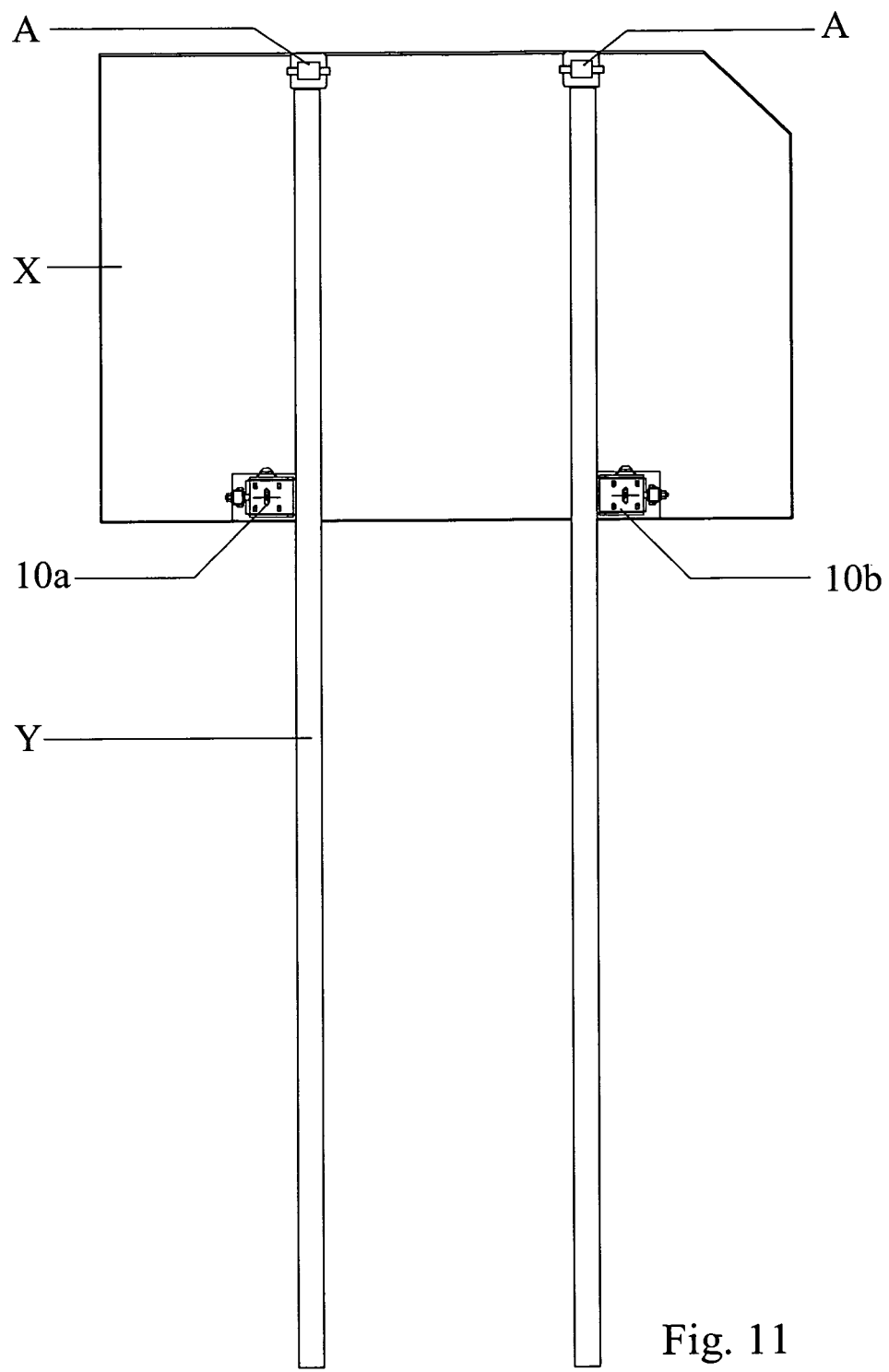
FIG. 11 is an overhead view of the placement of a paired embodiment of the improved cab suspension members on a terminal tractor frame.

It is preferred in the single rear suspension member 10 embodiment, FIG. 10, that the main carrier spring 70 is provided as at least a 500 pound/inch load rate capacity coiled compression spring. In the paired, rear suspension member 10A, 10B, embodiment, FIG. 11, the improved rear suspension members are provided with the cab side improved rear suspension member 10A with the main spring 70 provided as at least a 300 pound/inch load rate capacity coiled compression spring and the other improved rear suspension member 10B with the main spring 70 provided as at least a 200 pound capacity coiled compression spring. The rebound spring 50 would be the same in all embodiments, as would the upper urethane spring 80.

Figure 8:
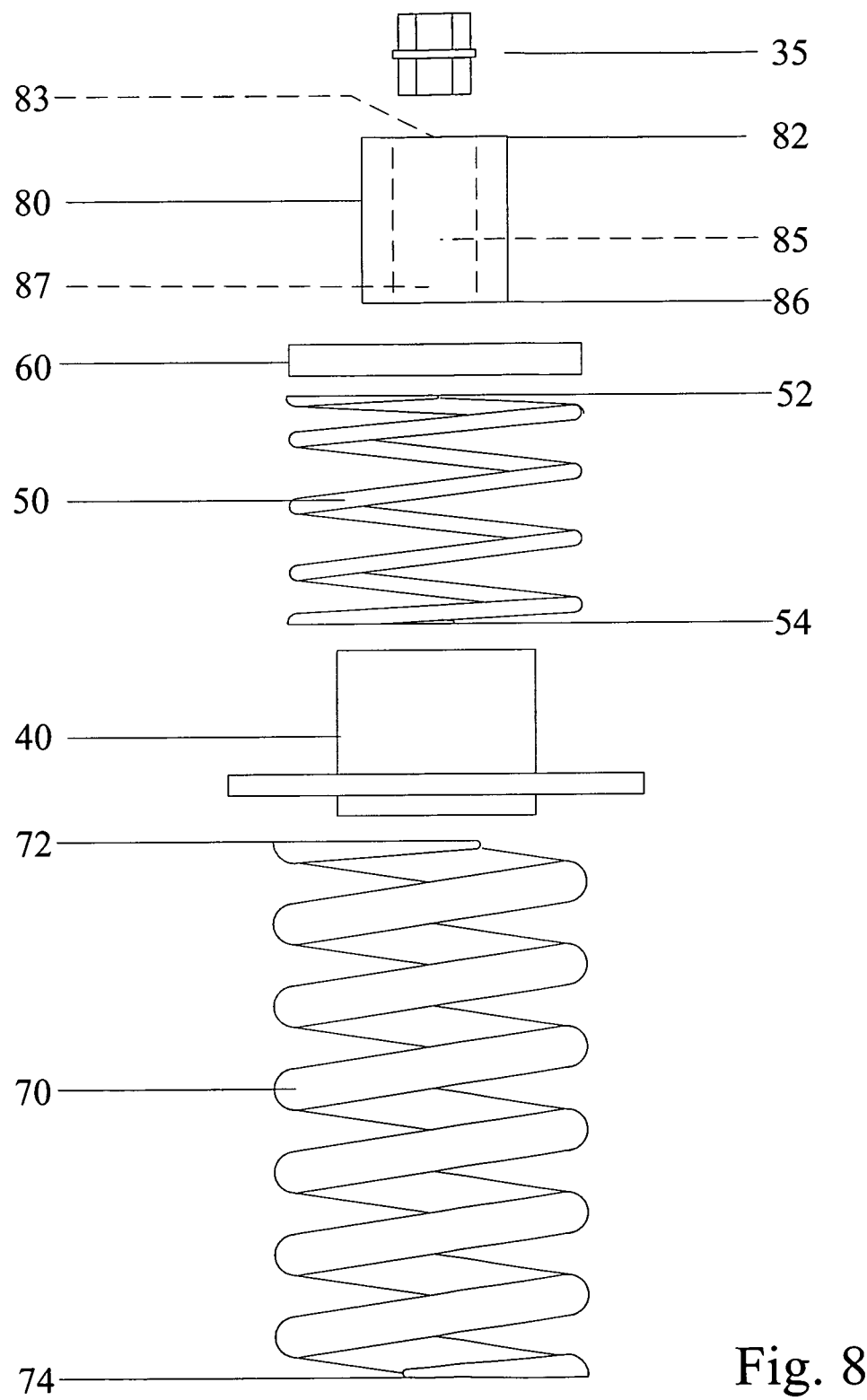
FIG. 8 is an expanded alignment diagram of the center support and spring mount, the rebound spring, the upper spring capture plate, the main carrier spring and the upper urethane spring of the improved cab suspension member.
Figure 9A:
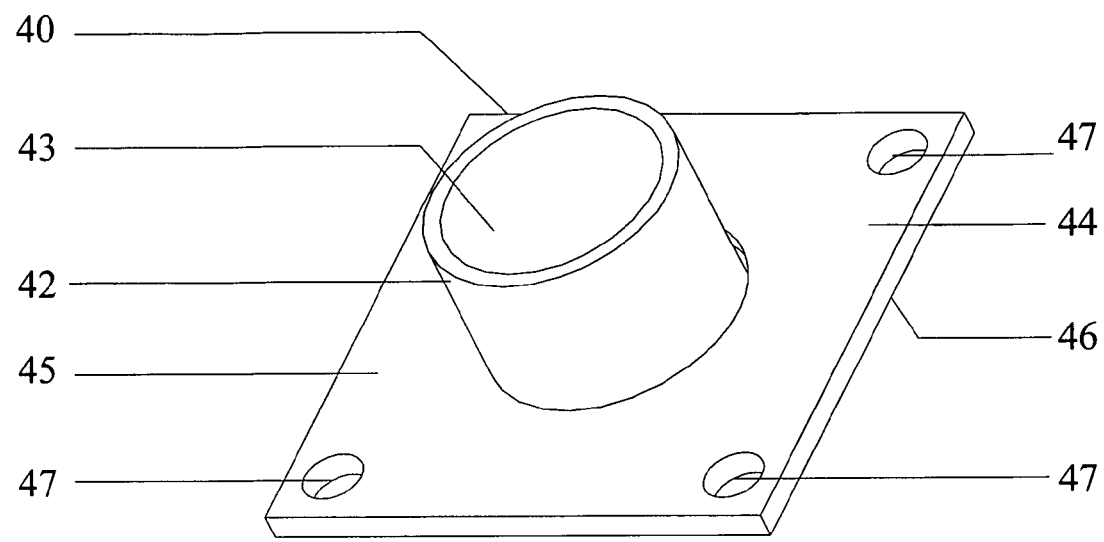
FIG. 9A is an upper perspective view of the center support and spring mount.
Figure 9B:
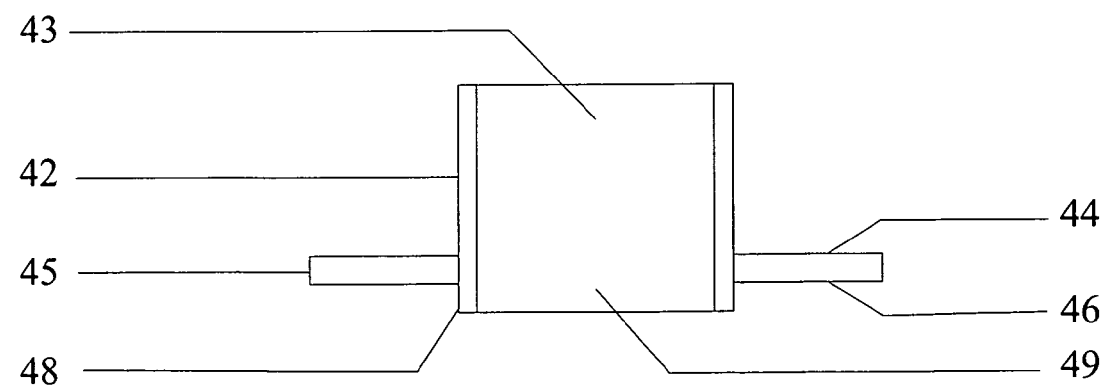
FIG. 9B is a cross-sectional side view of the center support and spring mount.

As represented in FIG. 8, the purpose of the main carrier spring 70, defining an upper end 72 and a lower end 74, is a high capacity coiled compression spring providing a suspension cushion to reduce downward forces which are generated by movement over a rough surface, otherwise known as a compressed state. The function of the rebound spring 50 is to reduce the upward force, which would place the improved cab suspension member in an extended state, and return the improved suspension member 10 to an non-compression or neutral state. The rebound spring 50 is also a high capacity coiled compression spring and defines an upper end 52 and a lower end 54. The shock absorber 300 provides the improved cab suspension member 10 with an upward and downward compression force between the lower latch bracket 100 and upper housing 200 and also provided a secondary support connection for the entire improved cab suspension member 10. The upper urethane spring 80, defining upper end 82 with a central bore hole 83, a lower end 86 with a central bore hole 87 and an axial bore 85 connecting the central bore holes 83, 87 of the upper and lower ends 82, 86, is provided at an upper threaded end 32 of the suspension capsule retainer bolt 30 over the washer and nut assembly 35 as a preventative measure for extreme upward forces to provide a second stage compression spring of at least 1800 pound per inch load rate and also as a cushion barrier between the suspension capsule retainer bolt 30 and a lower surface 203 of an upper mounting plate 201 within the upper housing 200 to reduce the potential for deformation of the components of the improved cab suspension member 10.

Figure 4:
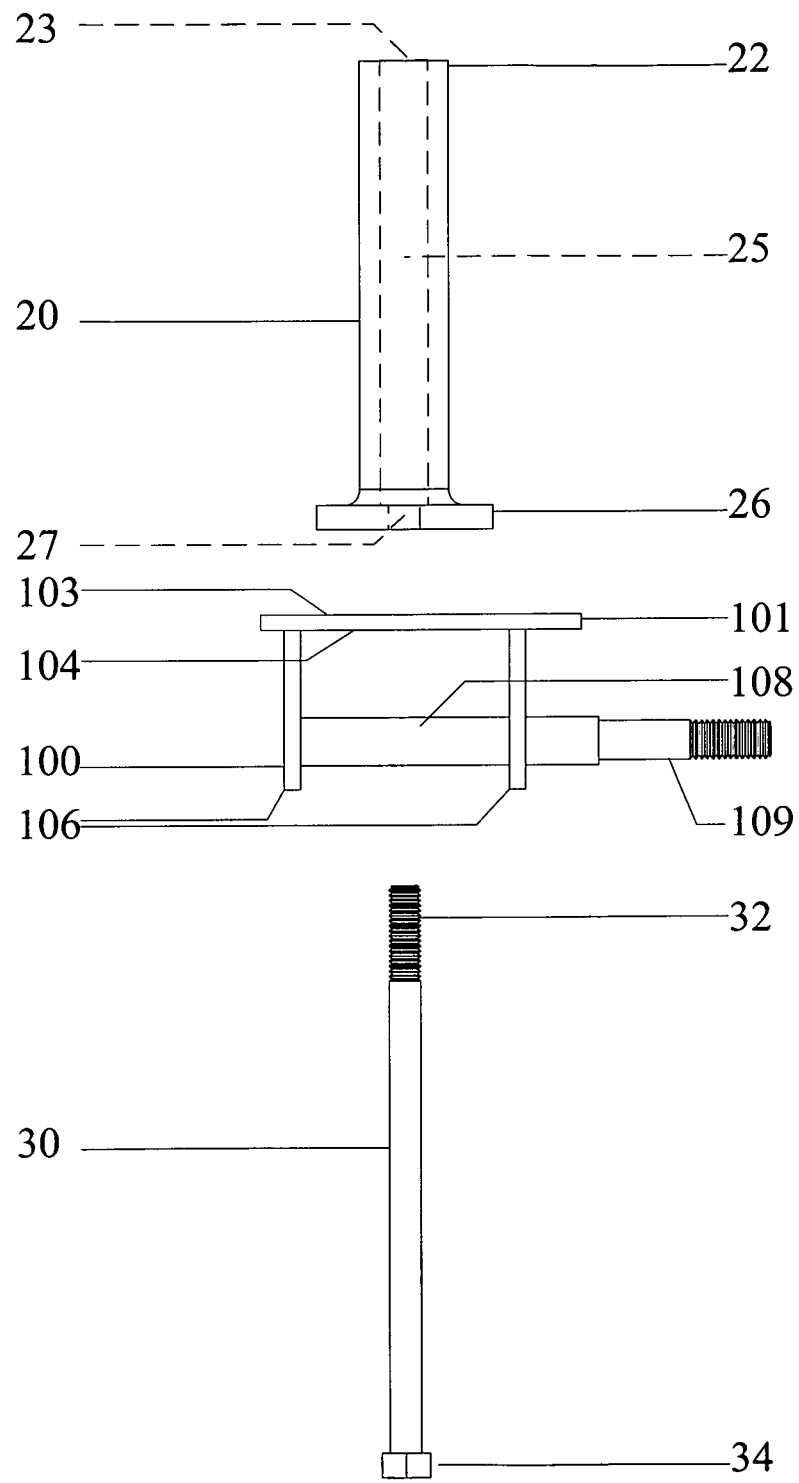
FIG. 4 is an expanded alignment diagram of the center support tube, the lower latch bracket and shock mount and the suspension capsule retainer bolt.

The center support tube 20, FIGS. 1 and 4, further comprises an upper end 22 having a central bore hole 23, a flanged lower end 26 having a central bore hole 27 and an axial bore 25 between the central bore holes 23, 27 of the upper and lower ends 22, 26. The suspension capsule retainer bolt 30 is inserted through the axial bore 25 of the central support tube 20 in the assembly of improved cab suspension member 10. The suspension capsule retainer bolt 30, FIGS. 1 and 4, further comprises the threaded upper end 32, to which the washer and nut assembly 35 is engaged, and a lower end head 34.

Figure 3:
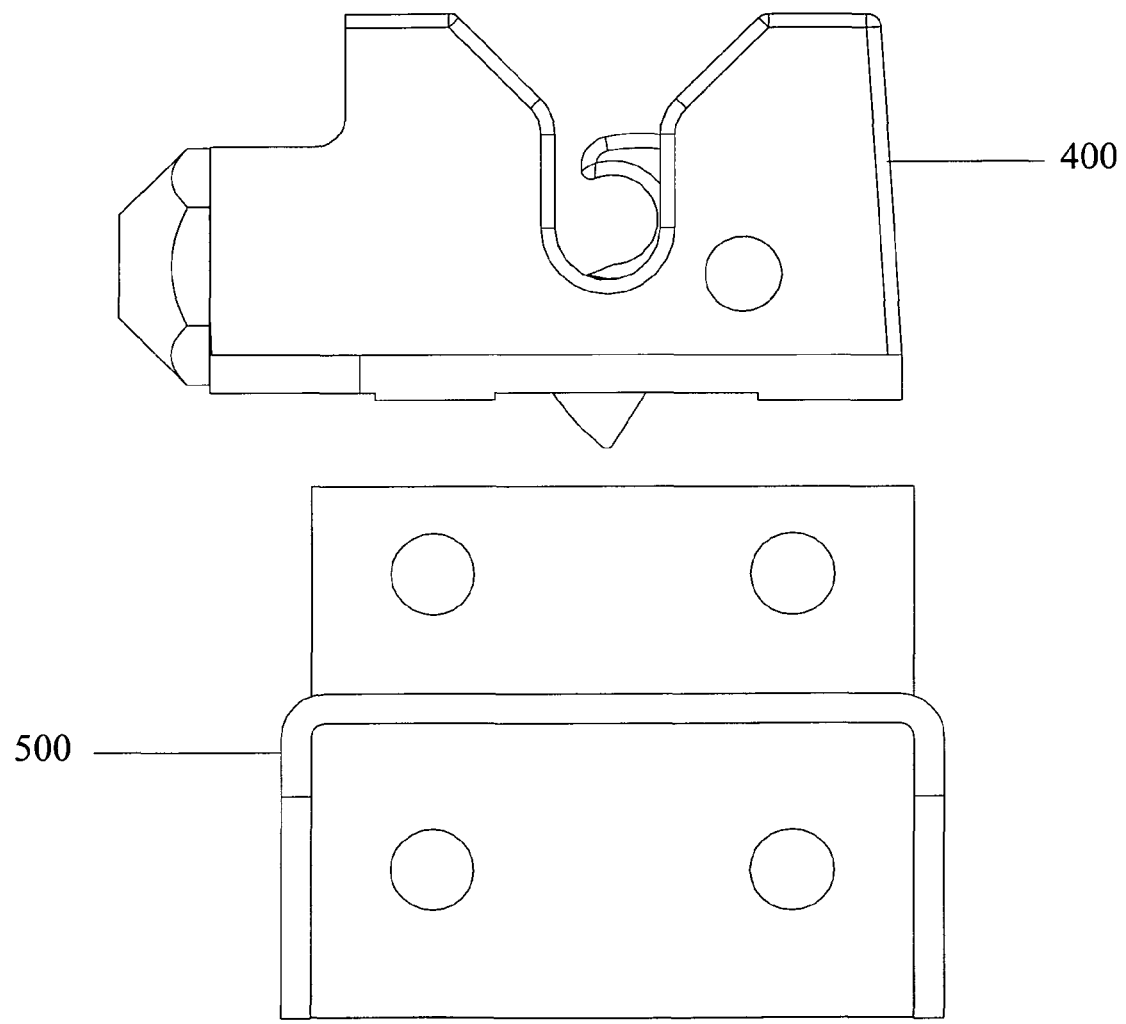
FIG. 3 is a view of a hydraulic latch assembly and hydraulic latch mounting bracket used in the improved cab suspension member.
Figure 5:
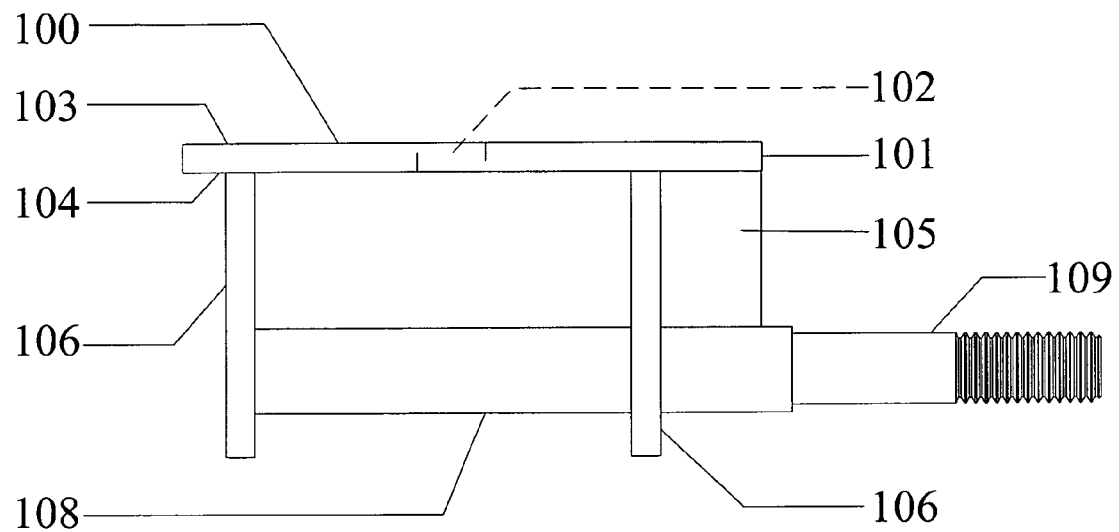
FIG. 5 is an isolated side view of the lower latch bracket and shock mount.

The lower latch bracket 100, FIGS. 1 and 4-5, further provides an upper plate 101 providing a centered capsule retaining bolt hole 102 and defining an upper surface 103 and a lower surface 104, a pair of parallel side plates 106 supporting a transverse oriented latch bar 108 and extending the lower shock mounting stud 109, a shock mount support plate 105 providing additional structural support between the lower surface 104 of the upper plate 101, one side plate 106 and the portion of the latch bar 108 extending laterally from the side plate 106, as indicated in FIG. 5. The latch bar 108 provides the means of connection to the conventional hydraulic latch assembly 400 and the hydraulic latch mounting bracket 500, FIG. 3, supplied on most terminal tractor chassis Y. If the terminal tractor chassis Y to which the improved cab suspension member 10 is applied does not provide the type of hydraulic latch assembly 400 and hydraulic latch mounting bracket 500 conforming in function and utility as that shown, then the hydraulic latch assembly 400 and hydraulic latch mounting bracket 500 shown in FIGS. 1 and 3 should be included in the modification of the terminal tractor chassis Y.

Figure 6A:
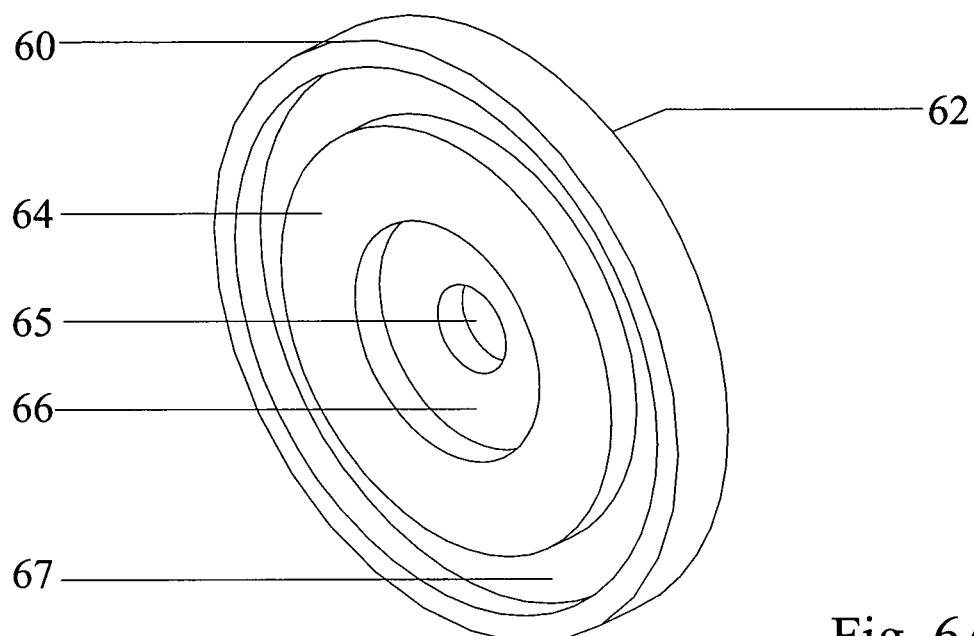
FIG. 6A is a lower perspective view of the upper spring capture plate.
Figure 6B:
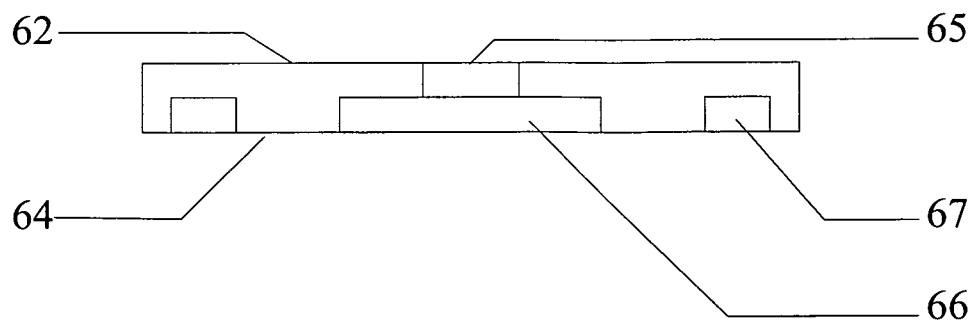
FIG. 6B is a side cross-sectional view of the upper spring capture plate.

The upper spring capture plate 60, FIGS. 6A and 6B, further provides some important surface features that provide support and orientation for the improved cab suspension member 10 including an upper surface 62 with a center bore 65 and a lower surface 64 defining a center tube recess 66 and a rebound spring retaining recess 67, the center tube recess 66 providing an upper support insertion for the upper end 22 of the center support tube 20, and the rebound spring retaining recess 67 defining an upper support insertion for the upper end 52 of the rebound spring 50, with the upper surface 62 providing a support for the lower end 86 of the upper urethane spring 80, FIG. 8.

Figure 7:
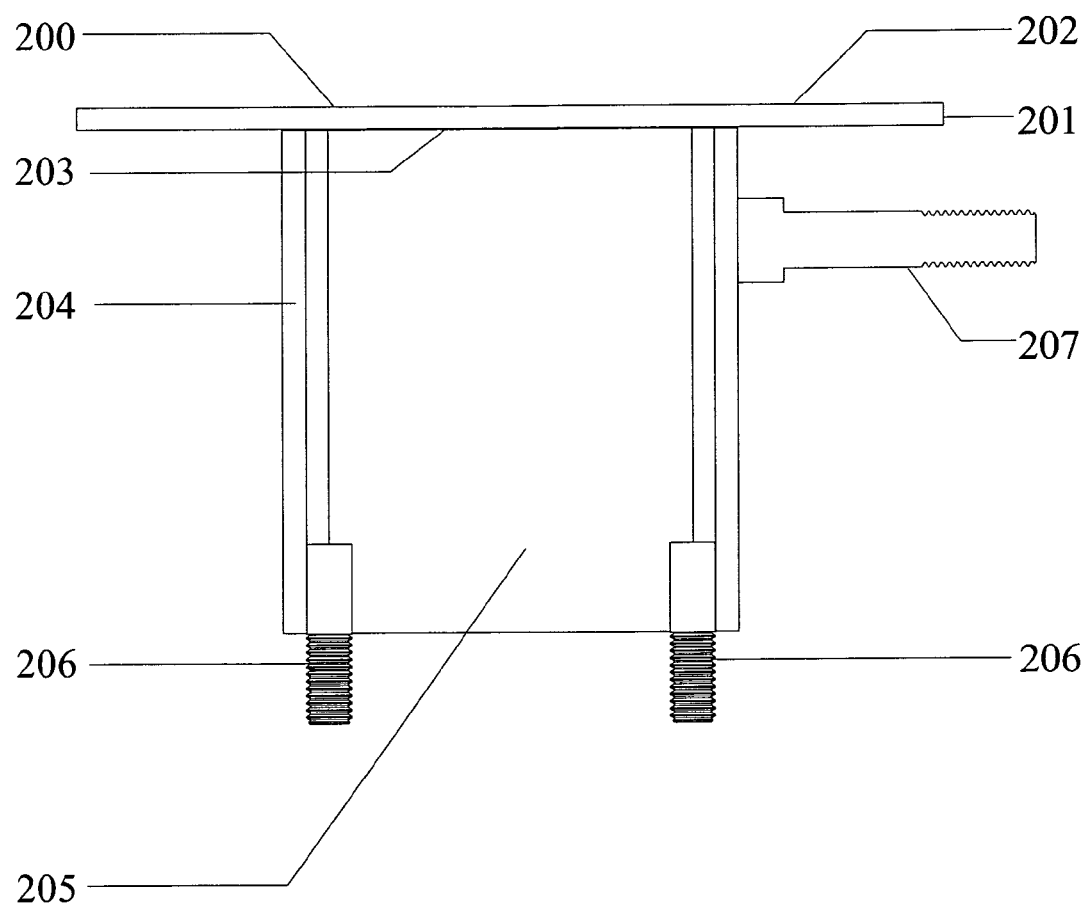
FIG. 7 is a cross-sectional view of the upper housing assembly of the improved cab suspension member.

The upper housing 200, as shown in FIGS. 1 and 7, comprises an upper mounting plate 201 defining an upper surface 202, which would be attached to the underside of the terminal tractor cab X, aligning the improved cab suspension member 10 over the existing or installed hydraulic latch assembly 400 for connectability, not shown but readily located to those skilled in the art of terminal tractor suspensions. The upper housing 200 further comprises a lower surface 203 on the upper mounting plate 201 to which is secured a housing tube 204, the housing tube 204 defining an inner cavity 205, the housing tube 204 laterally extending the upper shock mounting stud 207 and further extending at least four center support mounting studs 206. The inner cavity 205 of the housing tube 204, when the improved cab suspension member 10 is fully assembled, contains the portion of the improved cab suspension member including the rebound spring 50, the upper spring capture plate 60, the upper urethane spring 80 and the washer and nut assembly 30 attached to the upper threaded end 32 of the suspension capsule retainer bolt 30.

The center support and spring mount 40, as shown in FIGS. 1, 8 9A and 9B comprises a center mounting plate 45 defining an upper surface 44 and a lower surface 46 and a plurality of upper housing stud mounting holes 47, matched in number and configuration to the number and location of the center support mounting studs 206, the upper surface 44 extending an upper spring retainer sleeve 42 defining a central tube bore 43, and the lower surface 46 extending a main carrier spring guide 48 and defining a central tube bore 49. The center support and spring mount 40 provides separation and orientation between the main carrier spring 70 and the rebound spring 50 and maintains the placement of the rebound spring 50 in a position by the upper spring retainer sleeve 42 positioned within the lower end 54 of the rebound spring 50 and placement of the main carrier spring 70 in position by the main carrier spring guide 48 inserted within the upper end 72 of the main carrier spring 70. The center support and spring mount 40 is further attached to the upper housing 200 by the placement and securing of the at least four center support mounting studs 206 within the plurality of upper housing stud mounting holes 47 in the center mounting plate 40.

The assembly of the components of each improved cab suspension member, shown in FIG. 1, would commence by the insertion of the upper threaded end 32 of the suspension capsule retainer bolt 30 through the capsule retaining bolt hole 102 of the lower latch bracket 100, placement of the axial bore 25 of the center support tube 20 over the upward extending suspension capsule retainer bolt 30, placement of the main carrier spring 70 over the center support tube 20, placement of the center support and spring mount 40 over the center support tube 20 with the main carrier spring guide 48 within the upper end 72 of the main carrier spring 70, placement of the rebound spring 50 upon the upper spring retainer sleeve 42, application of the upper spring capture plate 60 over the rebound spring 50 and upon the suspension capsule retainer bolt 30, insertion of the axial bore 85 of the upper urethane spring 80 over the washer and nut assembly 35 attached upon the upper threaded end 32 of the suspension capsule retainer bolt 30 until seated upon the upper surface 62 of the upper spring capture plate 60. The upper housing 200 is then attached to the center support and spring mount 40 by securing the at least four center support mounting studs 206 within the corresponding aligned plurality of upper housing stud mounting holes 47.

Figure 2:
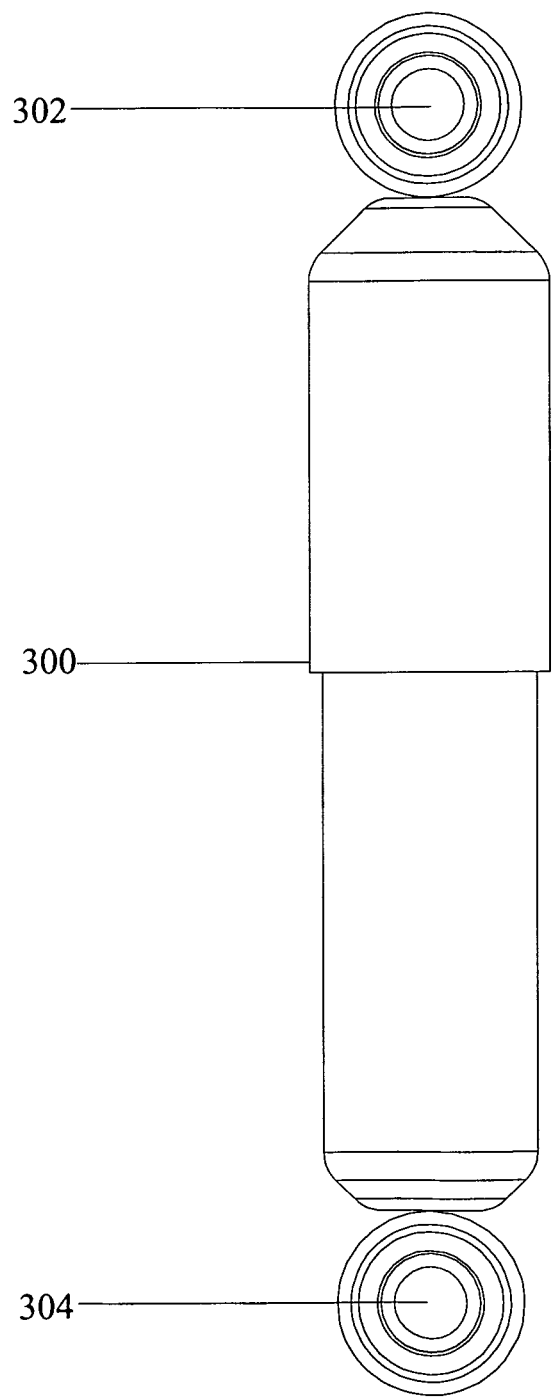
FIG. 2 is an isolated drawing of a shock absorber used in the improved cab suspension member.

In final preparation, the shock absorber 300, defining an upper end 302 and a lower end 304, FIGS. 1 and 2, is installed and secured within the improved cab suspension member 10, the upper end 302 of the shock absorber 300 placed and secured upon the upper shock mounting stud 207 and the lower end 304 of the shock absorber 300 placed and secured upon the lower shock mounting stud 109. The means of securing is not shown, but conventional attachment using a nut or other securing means is contemplated, the studs, represented in FIGS. 4, 5 and 7 being shown with threads included on the respective ends of the studs. The shock absorber 300, incorporated into the improved cab suspension member, provides additional lateral stability and enhanced vertical suspension support to the improved cab suspension member 10.

The improved cab suspension member 10 is then installed either as an original suspension element on a terminal tractor or installed as a replacement to a factory installed suspension element. While not made part of the present improved cab suspension member 10, it is contemplated that this cab suspension member would be preferably used in conjunction with the front suspension assemblies A as defined within the Eng '970 patent, issued on Jun. 25, 2002, and/or as a substitute for the single rear suspension assembly as claimed in that patent.

While the invention has been particularly shown and described with reference to a preferred embodiment thereof, it will be understood by those skilled in the art that changes in form and detail may be made therein without departing from the spirit and scope of the invention.

What is claimed is:

1. A single improved cab suspension member replacing one or more existing suspension members between a terminal tractor cab and a terminal tractor chassis in a terminal tractor, providing an improved distribution of the weight of the cab and a more balanced and smooth ride than said existing suspension members, said improved rear suspension member comprising:

an upper housing,
a lower latch bracket,
a suspension capsule retainer bolt inserted through a capsule retaining bolt hole in an upper plate of said lower latch bracket, said retainer bolt further retaining and positioning,
a center support tube having an axial bore through which said suspension capsule retainer bolt is inserted, said center support tube providing support to;
a main carrier spring, a rebound spring, a center support and spring mount installed between said rebound spring and said main carrier spring, an upper spring capture plate over said rebound spring, an upper urethane spring and a washer and nut assembly, said washer and nut assembly threadably engaging an upper threaded end of said suspension capsule retainer bolt; and
a shock absorber secured between a lower shock mounting stud extending laterally from said lower latch bracket and a laterally extending upper shock mounting stud extending laterally from said upper housing, said lower latch bracket further providing a transverse oriented latch bar to which an existing hydraulic latch assembly mounted to a hydraulic latch mounting bracket installed upon said terminal tractor chassis secures said terminal tractor cab to said terminal tractor chassis in a transport position under a cab portion of said terminal tractor cab.

2. The single improved cab suspension member, as disclosed in claim 1, further comprising
said center support tube defining an upper end having a central bore hole, a flanged lower end having a central bore hole and said axial bore between said central bore holes of said upper and lower ends; and
said suspension capsule retainer bolt further comprises said threaded upper end, to which said washer and nut assembly is engaged, and a lower end head retaining said lower end head within said capsule retaining bolt hole of said lower latch bracket.

3. The single improved cab suspension member, as disclosed in claim 1, said lower latch bracket further comprising:
said upper plate providing said centered capsule retaining bolt hole and defining an upper surface and a lower surface, a pair of parallel side plates supporting a transverse oriented latch bar and extending a lower shock mounting stud, a shock mount support plate providing additional structural support between said lower surface of said upper plate, one of said pair of parallel side plates and the portion of the latch bar, said latch bar providing connection between said single improved cab suspension member and said hydraulic latch assembly and said hydraulic latch mounting bracket on said terminal tractor chassis.

4. The single improved cab suspension member, as disclosed in claim 1, said upper spring capture plate further comprising:
an upper surface with a center bore and a lower surface defining a center tube recess and a rebound spring retaining recess, said center tube recess providing insertion and lateral support for an upper end of said center support tube, and said rebound spring retaining recess providing insertion and lateral support for an upper end of said rebound spring, with said upper surface providing support for said lower end of said upper urethane spring within said single improved cab suspension member.

5. The single improved cab suspension member, as disclosed in claim 1, said upper housing further comprising:
an upper mounting plate defining an upper surface, attaching below said terminal tractor cab, aligning said improved cab suspension member above said hydraulic latch assembly and a lower surface;
a housing tube extending below said lower surface, said housing tube defining an inner cavity;
a laterally extending upper shock mounting stud attached to said housing tube; and
at least four center support mounting studs further extending below said housing tube, said inner cavity of said housing tube containing said rebound spring, said upper spring capture plate, said upper urethane spring and said washer and nut assembly attached to said upper threaded end of the suspension capsule retainer bolt within said improved cab suspension member.

6. The single improved cab suspension member, as disclosed in claim 1, said center support and spring mount further comprising:
a center mounting plate defining an upper surface, a lower surface and a plurality of upper housing stud mounting holes, matched in number and configuration to the number at least four center support mounting studs extending below a housing tube attached upon a lower surface of an upper mounting plate of said upper housing;
an upper spring retainer sleeve extending above said upper surface of said center mounting plate and defining a central tube bore; and
a main carrier spring guide extending below said lower surface of said center mounting plate and defining a central tube bore, said center support and spring mount providing separation and orientation between said main carrier spring and said rebound spring and maintaining placement of said rebound spring upper said spring retainer sleeve inserted within a lower end of said rebound spring while also maintaining placement of said main carrier spring with said main carrier spring guide inserted within an upper end of said main carrier spring, said center support and spring mount further attached to said upper housing by placement and securing of said at least four center support mounting studs of said upper housing within said plurality of upper housing stud mourning holes in said center mounting plate.

7. The single improved cab suspension member, as disclosed in claim 1, further comprising:
said main carrier spring is a high capacity coiled compression spring defining an upper end and a lower end and providing at least 500 pounds/inch of load capacity, said main carrier providing a suspension cushion to reduce impact forces which are generated by movement over a rough surface, said main carrier spring provided to overcome a compressed state of said single improved cab suspension member;
said rebound spring is a high capacity coiled compression spring defining an upper end and a lower end, provided to enhance rebound forces of the single improved cab suspension member during an extended state, and return said improved suspension member to an non-compression neutral state;
said shock absorber defining an upper end and a lower end respectively attaching to said upper and lower shock mounting studs, said shock absorber further providing said improved cab suspension member with additional suppression of vertical compression forces between said lower latch bracket and said upper housing while also provided a secondary support attachment for said entire improved cab suspension member; and
said upper urethane spring, defining an upper end with a central bore hole, a lower end with a central bore hole and an axial bore connecting said central bore holes of said upper and lower ends, said upper urethane spring providing a secondary compression spring with a load rate of at least 1800 pounds/inch deflection and a stiffer second stage compression spring and a deterrent against extreme upward forces as a cushion bather between said upper threaded end of said suspension capsule retainer bolt and a lower surface of an upper mounting plate within said upper housing to reduce potential for deformation of said improved cab suspension member.

8. The single improved cab suspension member, as disclosed in claim 1, further comprising
said center support tube defining an upper end having a central bore hole, a flanged lower end having a central bore hole and said axial bore between said central bore holes of said upper and lower ends;
said suspension capsule retainer bolt defining said threaded upper end, to which said washer and nut assembly is engaged, and a lower end head retaining said lower end head within said capsule retaining bolt hole of said lower latch bracket;

said lower latch bracket defining said upper plate providing said centered capsule retaining bolt hole and defining an upper surface and a lower surface, a pair of parallel side plates supporting said transverse oriented latch bar and extending said lower shock mounting stud, a shock mount support plate providing additional structural support between said lower surface of said upper plate, one of said pair of parallel side plates and the portion of said latch bar, said latch bar providing connection between said single improved cab suspension member and said hydraulic latch assembly and said hydraulic latch mounting bracket on said terminal tractor chassis;

said upper spring capture plate defining an upper surface with a center bore and a lower surface defining a center tube recess and a rebound spring retaining recess, said center tube recess providing insertion and lateral support for an upper end of said center support tube, and said rebound spring retaining recess providing insertion and lateral support for an upper end of said rebound spring, with said upper surface providing support for a lower end of said upper urethane spring within said improved cab suspension member;

said upper housing defining an upper mounting plate defining an upper surface, attaching below said terminal tractor cab, aligning said improved cab suspension member above said hydraulic latch assembly and a lower surface, a housing tube extending below said lower surface, said housing tube defining an inner cavity, said laterally extending upper shock mounting stud attached to said housing tube, and at least four center support mounting studs further extending below said housing tube, said inner cavity of said housing tube containing said rebound spring, said upper spring capture plate, said upper urethane spring and said washer and nut assembly attached to said upper threaded end of the suspension capsule retainer bolt within said improved cab suspension member; and said center support and spring mount providing a center mounting plate defining an upper surface, a lower surface and a plurality of upper housing stud mounting holes, matched in number and configuration to the number of at least four center support mounting studs extending below said housing tube attached upon said lower surface of said upper mounting plate of said upper housing, an upper spring retainer sleeve extending above said upper surface of said center mounting plate and defining a central tube bore, and a main carrier spring guide extending below said lower surface of said center mounting plate and defining a central tube bore, said center support and spring mount providing separation and orientation between said main carrier spring and said rebound spring and maintaining placement of said rebound spring upper said spring retainer sleeve inserted within a lower end of said rebound spring while also maintaining placement of said main carrier spring with said main carrier spring guide inserted within an upper end of said main carrier spring, said center support and spring mount further attached to said upper housing by placement and securing of said at least four center support mounting studs of said upper housing within said plurality of upper housing stud mounting holes in said center mounting plate.

9. A pair of improved cab suspension members replacing a pair of existing rear suspension members between a terminal tractor cab and a terminal tractor chassis in a terminal tractor, providing an improved distribution of the weight of the cab and a more balanced and smooth ride than said existing suspension members, each said pair of improved rear suspension members comprising:

an upper housing, a lower latch bracket, a suspension capsule retainer bolt inserted through a capsule retaining bolt hole in an upper plate of said lower latch bracket, said retainer bolt further retaining and positioning, a center support tube having an axial bore through which said suspension capsule retainer bolt is inserted, said center support tube providing support to;

a main carrier spring, a rebound spring, a center support and spring mount installed between said rebound spring and said main carrier spring, an upper spring capture plate over said rebound spring, an upper urethane spring and a washer and nut assembly, said washer and nut assembly threadably engaging an upper threaded end of said suspension capsule retainer bolt; and a shock absorber secured between a lower shock mounting stud extending laterally from said lower latch bracket and a laterally extending upper shock mounting stud extending laterally from said upper housing, said lower latch bracket further providing a transverse mounted latch bar to which an existing hydraulic latch assembly mounted to a hydraulic latch mounting bracket installed upon said terminal tractor chassis secures said terminal tractor cab to said terminal tractor chassis in a transport position under a cab portion of said terminal tractor cab.

10. The pair of improved cab suspension members, as disclosed in claim 9, each said improved cab suspension member further comprising said center support tube defining an upper end having a central bore hole, a flanged lower end having a central bore hole and said axial bore between said central bore holes of said upper and lower ends; and said suspension capsule retainer bolt further comprises said threaded upper end, to which said washer and nut assembly is engaged, and a lower end head retaining said lower end head within said capsule retaining bolt hole of said lower latch bracket.

11. The pair of improved cab suspension members, as disclosed in claim 9, each said lower latch bracket further comprising:

said upper plate providing said centered capsule retaining bolt hole and defining an upper surface and a lower surface, a pair of parallel side plates supporting a transverse oriented latch bar and extending a lower shock mounting stud, a shock mount support plate providing additional structural support between said lower surface of said upper plate, one of said pair of parallel side plates and the portion of the latch bar, said latch bar providing connection between said single improved cab suspension member and said hydraulic latch assembly and said hydraulic latch mounting bracket on said terminal tractor chassis.

12. The pair of improved cab suspension members, as disclosed in claim 9, each said upper spring capture plate further comprising:

an upper surface with a center bore and a lower surface defining a center tube recess and a rebound spring retaining access, said center tube recess providing insertion and lateral support for an upper end of said center support tube, and said rebound spring retaining recess providing insertion and lateral support for an upper end of said rebound spring, with said upper surface providing support for said lower end of said upper urethane spring within said improved cab suspension member.

13. The pair of improved cab suspension members, as disclosed in claim 9, each said upper housing further comprising:
- an upper mounting plate defining an upper surface, attaching below said terminal tractor cab, aligning said improved cab suspension member above said hydraulic latch assembly and a lower surface;
- a housing tube extending below said lower surface, said housing tube defining an inner cavity;
- a laterally extending upper shock mounting stud attached to said housing tube; and
- at least four center support mounting studs further extending below said housing tube, said inner cavity of said housing tube containing said rebound spring, said upper spring capture plate, said upper urethane spring and said washer and nut assembly attached to said upper threaded end of the suspension capsule retainer bolt within said improved cab suspension member.

14. The pair of improved cab suspension members, as disclosed in claim 9, each said center support and spring mount further comprising:
- a center mounting plate defining an upper surface, a lower surface and a plurality of upper housing stud mounting holes, matched in number and configuration to the number at least four center support mounting studs depending below a housing tube attached upon a lower surface of an upper mounting plate of said upper housing;
- an upper spring retainer sleeve extending above said upper surface of said center mounting plate and defining a central tube bore; and
- a main carrier spring guide extending below said lower surface of said center mounting plate and defining a central tube bore, said center support and spring mount providing separation and orientation between said main carrier spring and said rebound spring and maintaining placement of said rebound spring upper said spring retainer sleeve inserted within a lower end of said rebound spring wile also maintaining placement of said main carrier spring with said main carrier spring guide inserted within an upper end of said main carrier spring, said center support and spring mount further attached to said upper housing by placement and securing of said at least four center support mounting studs of said upper housing within said plurality of upper housing stud mounting holes in said center mounting plate.

15. The pair of improved cab suspension members, as disclosed in claim 9, each said improved cab suspension member further comprising:
- said main carrier spring in a first improved cab suspension member below a more weighted portion of said terminal tractor cab is a high capacity coiled compression spring defining an upper end and a lower end and providing at least 300 pounds/inch load rate capacity, said main carrier spring providing a suspension cushion to reduce impact forces which are generated by movement over a rough surface, said main carrier spring provided to overcome a compressed state of said single improved cab suspension member;
- said main carrier spring in a second improved cab suspension member below a less weighted portion of said terminal tractor cab is a high capacity coiled compression spring defining an upper end and a lower end and providing at least 200 pounds/inch load rate capacity, said main carrier spring also providing a suspension cushion to reduce impact forces which are generated by movement over a rough surface, said main carrier spring provided to overcome a compressed state of said single improved cab suspension member;
- said rebound spring is a high capacity coiled compression spring defining an upper end and a lower end, provided to enhance rebound forces of the single improved cab suspension member during an extended state, and return said improved suspension member to an non-compression neutral state;
- said shock absorber defining an upper end and a lower end respectively attaching to said upper and lower shock mounting studs, said shock absorber further providing said improved cab suspension member with additional suppression of vertical compression forces between said lower latch bracket and said upper housing while also provided a secondary support attachment for said entire improved cab suspension member; and
- said upper urethane spring, defining an upper end with a central bore hole, a lower end with a central bore hole and an axial bore connecting said central bore holes of said upper and lower ends, said upper urethane spring providing a secondary compression spring with a load rate of at least 1800 pounds/inch deflection and a deterrent against extreme upward forces as a cushion bather between said upper threaded end of said suspension capsule retainer bolt and a lower surface of an upper mounting plate within said upper housing to reduce potential for deformation of said improved cab suspension member.

16. The pair of improved cab suspension members, as disclosed in claim 9, each said improved cab suspension member further comprising:
- said center support tube defining an upper end having a central bore hole, a flanged lower end having a central bore hole and said axial bore between said central bore holes of said upper and lower ends;
- said suspension capsule retainer bolt defining said threaded upper end, to which said washer and nut assembly is engaged, and a lower end head retaining said lower end head within said capsule retaining bolt hole of said lower latch bracket;
- said lower latch bracket defining said upper plate providing said centered capsule retaining bolt hole and defining an upper surface and a lower surface, a pair of parallel side plates supporting said transverse oriented latch bar and extending said lower shock mounting stud, a shock mount support plate providing additional structural support between said lower surface of said upper plate, one of said pair of parallel side plates and the portion of said latch bar, said latch bar providing connection between said single improved cab suspension member and said hydraulic latch assembly and said hydraulic latch mounting bracket on said terminal tractor chassis;
- said upper spring capture plate defining an upper surface with a center bore and a lower surface defining a center tube recess and a rebound spring retaining access, said center tube recess providing insertion and lateral support for an upper end of said center support tube, and said rebound spring retaining recess providing insertion and lateral support for an upper end of said rebound spring, with said upper surface providing support for a lower end of said upper urethane spring within said improved cab suspension member;
- said upper housing defining an upper mounting plate defining an upper surface, attaching below said terminal tractor cab, aligning said improved cab suspension member above said hydraulic latch assembly and a lower surface, a housing tube extending below said lower surface, said housing tube defining an inner cavity, said laterally extending upper shock mounting stud attached to said housing tube, and at least four center support mounting studs further extending below said housing tube, said inner cavity of said housing tube containing said rebound spring, said upper spring capture plate, said upper urethane spring and said washer and nut assembly attached to said upper threaded end of the suspension capsule retainer bolt within said improved cab suspension member; and said center support and spring mount providing a center mounting plate defining an upper surface, a lower surface and a plurality of upper housing stud mounting holes, matched in number and configuration to the number of at least four center support mounting studs extending below said housing tube attached upon said lower surface of said upper mounting plate of said upper housing, an upper spring retainer sleeve extending above said upper surface of said center mounting plate and defining a central tube bore, and a main carrier spring guide extending below said lower surface of said center mounting plate and defining a central tube bore, said center support and spring mount providing separation and orientation between said main carrier spring and said rebound spring and maintaining placement of said rebound spring upper said spring retainer sleeve inserted within a lower end of said rebound spring while also maintaining placement of said main carrier spring with said main carrier spring guide inserted within an upper end of said main carrier spring, said center support and spring mount further attached to said upper housing by placement and securing of said at least four center support mounting studs of said upper housing within said plurality of upper housing stud mounting holes in said center mounting plate.

* * * * *